US012124482B2

(12) United States Patent
Caldwell

(10) Patent No.: US 12,124,482 B2
(45) Date of Patent: *Oct. 22, 2024

(54) AUTOMATED DATA SUPPLEMENTATION AND VERIFICATION

(71) Applicant: MX Technologies, Inc., Lehi, UT (US)

(72) Inventor: John Ryan Caldwell, Lehi, UT (US)

(73) Assignee: MX Technologies, Inc., Lehi, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/390,951

(22) Filed: Jul. 31, 2021

(65) Prior Publication Data

US 2021/0357435 A1 Nov. 18, 2021

Related U.S. Application Data

(63) Continuation of application No. 15/424,780, filed on Feb. 3, 2017, now Pat. No. 11,093,528.

(60) Provisional application No. 62/290,940, filed on Feb. 3, 2016.

(51) Int. Cl.
*G06F 16/28* (2019.01)
(52) U.S. Cl.
CPC .................................. *G06F 16/287* (2019.01)
(58) Field of Classification Search
None
See application file for complete search history.

(56) References Cited

U.S. PATENT DOCUMENTS

| 2011/0041173 A1* | 2/2011 | Kurtzig | G06Q 30/0207 |
| | | | 726/7 |
| 2013/0254787 A1* | 9/2013 | Cox | G06Q 30/02 |
| | | | 725/13 |
| 2016/0239559 A1* | 8/2016 | Morimoto | G06F 16/287 |
| 2017/0140474 A1* | 5/2017 | Tran | G06Q 10/063112 |
| 2017/0249399 A1* | 8/2017 | Hu | G06F 16/00 |

FOREIGN PATENT DOCUMENTS

WO WO-2015004598 A1 * 1/2015 ............ G06F 11/301

* cited by examiner

*Primary Examiner* — Amresh Singh
(74) *Attorney, Agent, or Firm* — Kunzler Bean & Adamson

(57) ABSTRACT

Apparatuses, systems, methods, and computer program products are disclosed for data supplementation and verification. A method includes determining that an identifier within aggregated data is not a previously classified known identifier. A method includes transmitting an identifier to a search interface of a server of a third party service provider. A method includes receiving results associated with an identifier from a third party service provider. A method includes parsing results to determine whether a plurality of results have a common pattern associated with a classification. A method includes, in response to determining that a plurality of results have a common pattern associated with a classification, associating the classification with an identifier based on the common pattern.

20 Claims, 7 Drawing Sheets

400

| Investment Fund | Inception Date | 1 mo | 3 mo | YTD | 12 mo | 3 yr | Inception to Date | Expense Ratio |
|---|---|---|---|---|---|---|---|---|
| PIMCO Income Fund - Institutional Class | 03/30/2007 | 1.05 | 1.39 | 8.72 | 8.72 | 6.15 | 9.04 | 0.45 |
| BlackRock High Yield Bond Portfolio - Class K | 11/19/1998 | 1.79 | 2.27 | 14.01 | 14.01 | 4.20 | 7.58 | 0.54 |
| DFA Inflation Protected Securities Portfolio - Institutional Class | 09/18/2006 | -0.10 | -2.98 | 4.67 | 4.67 | 2.24 | 4.36 | 0.12 |
| PIMCO Extended Duration Fund - Institutional Class Shares | 08/31/2006 | -0.71 | -17.41 | 1.67 | 1.67 | 12.33 | 9.11 | 0.50 |
| MFS Global Total Return Fund - Class R6 | 06/01/2012 | 0.96 | -3.10 | 5.70 | 5.70 | 2.72 | 7.52 | 0.78 |
| Putnam Equity Income Fund - Class R6 | 07/02/2012 | 2.44 | 5.69 | 14.03 | 14.03 | 7.76 | 14.70 | 0.55 |
| Harbor Mid Cap Value Fund - Institutional Class | 03/01/2002 | 2.65 | 10.35 | 18.99 | 18.99 | 8.63 | 8.35 | 0.88 |
| American Beacon Small Cap Value Fund - Institutional Class | 12/31/1998 | 3.10 | 13.79 | 26.77 | 26.77 | 8.02 | 11.05 | 0.82 |
| Principal Small Cap S&P 600 Index Fund - Institutional Class Shares | 03/01/2001 | 3.35 | 11.06 | 26.18 | 26.18 | 9.19 | 9.94 | 0.20 |
| ... | | | | | | | | |
| Janus Triton Fund - Class N | 05/31/2012 | 0.03 | 0.98 | 10.65 | 10.65 | 7.19 | 14.41 | 0.67 |
| Oppenheimer International Diversified Fund - Class I | 08/28/2012 | 0.74 | -6.58 | 1.03 | 1.03 | -1.27 | 6.87 | 0.82 |
| DFA International Small Cap Value Portfolio - Institutional Class | 12/29/1994 | 3.15 | 1.71 | 8.00 | 8.00 | 2.19 | 7.43 | 0.69 |
| Oppenheimer International Small-Mid Company Fund - Class I | 12/29/2011 | 0.67 | -5.23 | -0.06 | -0.06 | 5.06 | 15.90 | 0.98 |
| Oppenheimer Global Fund - Class I | 01/27/2012 | 0.58 | 0.26 | 0.59 | 0.59 | 2.46 | 9.66 | 0.71 |
| DFA Real Estate Securities Portfolio - Institutional Class | 01/05/1993 | 4.64 | -3.22 | 8.38 | 8.38 | 13.63 | 10.27 | 0.18 |
| DFA Global Real Estate Securities Portfolio - Institutional Class | 06/04/2008 | 3.93 | -5.25 | 6.56 | 6.56 | 9.61 | 5.28 | 0.24 |
| Franklin Utilities Fund - Class R6 | 05/01/2013 | 4.07 | -0.22 | 18.09 | 18.09 | 11.22 | 8.34 | 0.47 |

AUTOMATED DATA SUPPLEMENTATION AND VERIFICATION

CROSS-REFERENCES TO RELATED APPLICATIONS

This application is a continuation of U.S. patent application Ser. No. 15/424,780 entitled "AUTOMATED DATA SUPPLEMENTATION AND VERIFICATION" and filed on Feb. 3, 2017 for John Ryan Caldwell, which claims the benefit of U.S. Provisional Patent Application No. 62/290,940 entitled "AUTOMATED DATA SUPPLEMENTATION AND VERIFICATION" and filed on Feb. 3, 2016 for John Ryan Caldwell, which is incorporated herein by reference in its entirety for all purposes.

FIELD

This invention relates to data aggregation and more particularly relates to the automated supplementation, verification, and/or classification of aggregated data.

BACKGROUND

The collection and use of big data has many benefits. Accordingly, data is being collected and analyzed from a variety of different sources, and the data therefore has a similar variety of different formats. Often data can be incomplete or nonsensical, and may not provide meaningful insight on its own. Such data may be improperly classified, or may cause an inaccurate analysis or prediction.

SUMMARY

Methods are presented for data supplementation and/or verification. In one embodiment, a method includes determining that an identifier within aggregated data is not a previously classified and/or known identifier. A method, in a further embodiment, includes transmitting an identifier to a search interface of a server of a third party service provider. In certain embodiments, a method includes receiving results associated with an identifier from a third party service provider. A method, in one embodiment, includes parsing results to determine whether a plurality of the results have a common pattern associated with a classification. A method, in certain embodiments, includes, in response to determining that a plurality of results have a common pattern associated with a classification, associating the classification with an identifier based on the common pattern.

Computer program products are presented, comprising a computer readable storage medium storing computer usable program code executable to perform operations for data supplementation and/or verification. In one embodiment, an operation includes determining that an identifier within aggregated data is not a previously classified and/or known identifier. An operation, in a further embodiment, includes transmitting an identifier to a search interface of a server of a third party service provider. In certain embodiments, an operation includes receiving results associated with an identifier from a third party service provider. An operation, in one embodiment, includes parsing results to determine whether a plurality of the results have a common pattern associated with a classification. An operation, in certain embodiments, includes, in response to determining that a plurality of results have a common pattern associated with a classification, associating the classification with an identifier based on the common pattern. In a further embodiment, an operation includes, in response to determining that a plurality of results do not have a common pattern and do not have one of a plurality of common patterns, associating an identifier with a classification made by a user in a graphical user interface for accessing aggregated data.

Apparatuses are presented for data supplementation and/or verification. An apparatus, in one embodiment, includes means for determining that an identifier within aggregated data is not a previously classified and/or known identifier. An apparatus, in a further embodiment, includes means for transmitting an identifier to a search interface of a server of a third party service provider. In certain embodiments, an apparatus includes means for receiving results associated with an identifier from a third party service provider. An apparatus, in one embodiment, includes means for parsing results to determine whether a plurality of the results have a common pattern associated with a classification. An apparatus, in certain embodiments, includes means for, in response to determining that a plurality of results have a common pattern associated with a classification, associating the classification with an identifier based on the common pattern.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4 is a schematic block diagram illustrating one embodiment of downloaded and/or aggregated data;

FIG. 5 is a schematic block diagram illustrating one embodiment of results;

DETAILED DESCRIPTION

Figure 1:
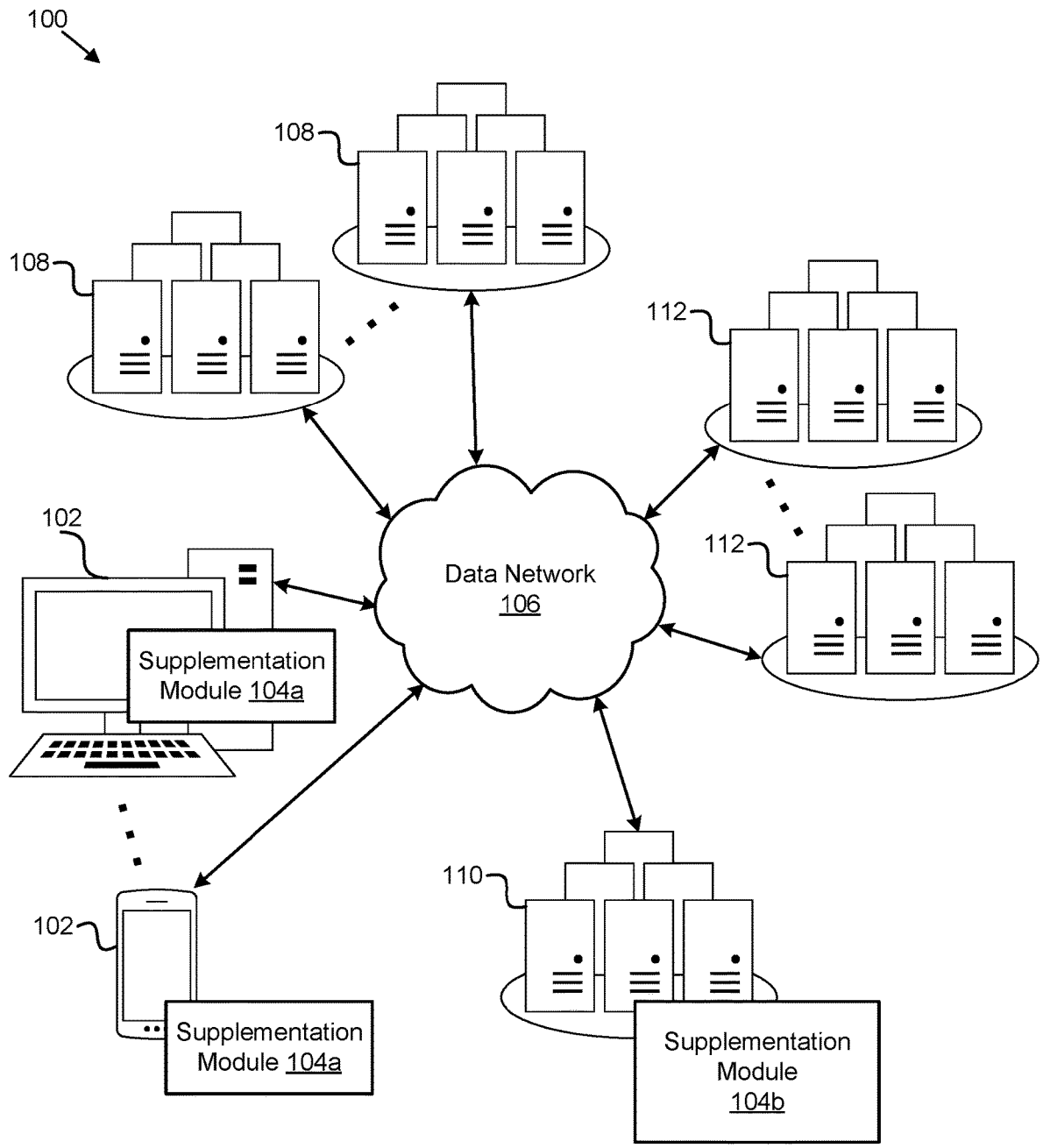
FIG. 1 is a schematic block diagram illustrating one embodiment of a system for data supplementation and/or verification.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 depicts one embodiment of a system 100 for data supplementation and/or verification. In one embodiment, the system 100 includes one or more user hardware devices 102, one or more supplementation modules 104 (e.g., a server supplementation module 104b and/or a plurality of supplementation modules 104a disposed on the one or more user hardware devices 102), one or more data networks 106 or other communication channels, one or more data sources 108 (e.g., aggregation data providers, one or more servers 108 of one or more service providers 108; one or more cloud or network service providers; or the like), one or more servers 110, and/or one or more supplemental data sources 112 (e.g., search engines, third party web servers, databases, or the like). In certain embodiments, even though a specific number of hardware devices 102, supplementation modules 104, data networks 106, data sources 108, servers 110, and/or supplemental data sources 112 are depicted in FIG. 1, one of skill in the art will recognize, in light of this disclosure, that any number of hardware devices 102, supplementation modules 104, data networks 106, data sources 108, servers 110, and/or supplemental data sources 112 may be included in the system 100 for data supplementation and/or verification.

In one embodiment, the system 100 includes one or more user hardware devices 102 and/or servers 110. The user hardware devices 102 and/or servers 110 (e.g., computing devices, information handling devices, or the like) may include one or more of a desktop computer, a laptop computer, a server computer, a mobile device, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, and/or another computing device comprising a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a volatile memory, and/or a non-volatile storage medium. In certain embodiments, the one or more hardware devices 102 and/or servers 110 are in communication with one or more data sources 108, one or more user hardware devices 102 may be in communication with one or more servers 110, or the like, via a data network 106, described below. The user hardware devices 102 and/or servers 110, in a further embodiment, are capable of executing various programs, program code, applications, instructions, functions, or the like.

In one embodiment, a supplementation module 104 is configured to download and/or otherwise receive data from one or more data sources 108 (e.g., data associated with a user, associated with a company or other business entity, or the like). The data the supplementation module 104 receives, in certain embodiments, may be incomplete, may include unknown and/or unrecognized identifiers (e.g., characters, words, strings, or the like), may include machine code, or may otherwise fail to include information that could be useful to a user and/or a hardware device 102, 110 to process and/or understand the data.

For example, in various embodiments, a supplementation module 104 may receive financial data such as transaction data, investment data, insurance data, or the like (e.g., from a data source 108 comprising a bank, credit union, lender, and/or another financial institution; from a data aggregator which may provide access to data from multiple financial institutions; from a flat file such as an account statement, a spreadsheet, a table, or the like, uploaded or otherwise provided by a user, downloaded from a data source 108, or the like; from a personal financial management application providing a transaction history, one or more budgets, one or more financial goals, an investment and/or wealth management tool, a net worth tool, or the like; and/or another data source 108). An identifier within the financial data (e.g., an identifier of a party to a transaction, such as a merchant, vendor, or the like; an identifier for an investment such as a bond, stock, mutual fund, option, future, derivative, commodity, retirement account, another security, or the like; an identifier for an insurance policy, provider, plan, or the like; or another financial item or object) may be vague, misleading, confusingly similar to another identifier, incomplete, obscure, a machine readable code (e.g., not in a human and/or natural language, a sequence of alphanumeric characters without a traditional linguistic meaning, or the like), or the like, making a correct categorization difficult or impossible.

Instead of or in addition to parsing the data and comparing it to known identifiers (e.g., for unmatched data, for unidentified data, or the like), the supplementation module 104 may query one or more supplemental data sources 112, such as a search engine, a repository of business data (e.g., business intelligence data, big data, or the like), a network of advisors and/or experts, or the like, to assist in classifying, categorizing, labeling, and/or matching the data. For example, the supplementation module 104 may submit an unidentifiable and/or unknown string (e.g., "Equity Account 476B") to a search engine supplemental data source 112, and may access and/or download one or more search results (e.g., webpages) for processing to categorize, label, and/or match the string.

The supplementation module 104, in certain embodiments, may use one or more machine learning and/or artificial intelligent techniques to process data from one or more supplemental data sources 112 and to categorize, label, and/or match data from a data source 108 based on the result. In one embodiment, the supplementation module 104 may use one or more rules to parse data (e.g., one or more webpages) from a supplemental data source 112 to categorize, label, and/or match data from a data source 108. For example, each category or label may have a set of one or more rules associated with it (e.g., if a predefined word or phrase is within N words, N lines, or the like of a searched string, the searched string belongs in the associated category or label; analyzing text/data around where a searched string appears; analyzing text in a header for a table or other data structure comprising a searched term; or the like).

The supplementation module 104 may use one or more supplemental data sources 112 to provide an initial, automated category and/or label for data from a data source 108 (e.g., classifying an investment as a bond, stock, mutual fund, option, future, derivative, commodity, retirement account, another security, or the like; as low risk, medium risk, as high risk, or the like; as a small market capitalization "cap" stock, as a big or large cap stock, as a micro-cap stock, as a mega cap stock, or the like; a current state of a bond such as retired, closed early, a remaining term; and/or another classification), and may display or otherwise provide the initial category and/or label to a user (e.g., in a graphical user interface (GUI) of a display of a user hardware device 102, as part of a personal financial management program or the like). The supplementation module 104 may confirm and/or correct its initial categorization and/or labeling using a network of advisors, experts, and/or other users.

The supplementation module 104 may provide a GUI to one or more advisors, experts, and/or other users allowing them to categorize and/or label data from one or more data sources 108, to correct or update an existing categorization and/or label, to vote on (e.g., confirm or deny, agree or disagree, or the like) an existing categorization and/or label, or the like. The supplementation module 104 may motivate the one or more advisors, experts, and/or other users to categorize, label, and/or vote, or to do so more regularly, by awarding them scores based on their contributions, by providing discounted access to the categorized and/or labeled data, or the like. The supplementation module 104 may share users' scores with other users, allow users to publish and/or share their scores, or the like (e.g., using dynamically updated widgets, profiles within a GUI of the supplementation module 104 on a display of a user hardware device 102, or the like). Awarding scores, in certain embodiments, may encourage accurate participation.

The supplementation module 104, in certain embodiments, may asymptotically (and/or according to another predefined function) award decreasing points over time to users' scores over time as users vote on a categorization and/or label, awarding more points (e.g., a greater increase in score) to users that vote first and fewer points to users that vote later. In one embodiment, the supplementation module 104 may reduce a user's score in response to determining that the user made an incorrect categorization and/or label. The reduction in a user's score may also be asymptotic, with the supplementation module 104 reducing scores by more for earlier contributors and less for later contributors, or the like.

In certain embodiments, the supplementation module 104 may block certain participation by a user in response to the user making an incorrect classification and/or label. For example, the supplementation module 104 may block a user from making a first vote, being the first to categorize and/or label, or the like in response to a first incorrect vote/categorization/label, a predefined threshold number of incorrect votes/categorizations/labels, or the like; may block or ban a user from voting/classifying/categorizing/labeling in response to the user making a predefined threshold number of incorrect votes/categorizations/labels; may increase a fee for accessing categorized and/or labeled data in response to one or more incorrect votes/categorizations/labels; or the like.

The supplementation module 104, in certain embodiments, may perform one or more tests to ensure that a human is doing the voting, classifying, categorizing, and/or labeling, not an automated process (e.g., a robot program or the like). For example, the supplementation module 104 may use a captcha check, may monitor a frequency with which a user votes, may monitor a frequency with which accounts are created, may monitor IP addresses from which users access the supplementation module 104, or the like, and may ban or block certain users and/or certain votes accordingly.

The supplementation module 104, in certain embodiments, may determine one or more scores for classifications and/or categorizations. For example, the supplementation module 104 may score a classification and/or categorization based on the scores of the users that voted for and/or against the classification and/or categorization, based on a number of votes, based on how recent the votes are (e.g., giving more recent votes more weight), or the like.

The supplementation module 104, in certain embodiments, may display one or more additional factors with a score for a categorization and/or classification, such as a trend over time (e.g., one or more historical categorizations and/or classifications, a histogram or other chart showing the number of votes over time for and against a categorization and/or classification, a histogram or other chart showing how the score has changes over time, an event or clarification which effected a categorization and/or classification, other categorizations/classifications/labels that are possible and/or have votes, or the like).

The supplementation module 104, in one embodiment, may proactively prompt and/or request that a user classify/categorize/label data. For example, the supplementation module 104 may make a prompt and/or request based on a user's expertise, based on a user's previous votes, to fill in missing or low quality data, or the like. The supplementation module 104 may present a prompt within a GUI on a user's hardware device 102, using an API, or the like. The supplementation module 104, in certain embodiments, may provide and/or display an impact of a potential vote on a user's score to the user, to encourage the user to make a vote.

In one embodiment, a supplementation module 104 is configured to determine and/or receive a user's electronic credentials (e.g., username and password, fingerprint scan, retinal scan, digital certificate, personal identification number (PIN), challenge response, security token, hardware token, software token, DNA sequence, signature, facial recognition, voice pattern recognition, bio-electric signals, two-factor authentication credentials, or the like) for one or more data sources 108. The supplementation module 104, in certain embodiments, accesses a server 108 of a data source 108 using a user's electronic credentials to download data associated with the user from the server 108, such as a user's photos, a user's social media posts, a user's medical records, a user's financial transaction records or other financial data, and/or other data associated with and/or owned by a user but stored by a server 108 of a data source 108 (e.g., stored by hardware not owned, maintained, and/or controlled by the user). The supplementation module 104, in various embodiments, may provide the downloaded data to the user locally (e.g., displaying the data on an electronic display of a hardware device 102); may provide the downloaded data from the hardware device 102 of the user to a server 110 (e.g., a server supplementation module 104b) which may be unaffiliated with the data source 108; may provide one or more alerts, messages, advertisements, or other communications to the user (e.g., on a hardware device 102) based on the downloaded data; or the like.

In certain embodiments, the system 100 includes a plurality of supplementation modules 104 disposed/located on hardware devices 102 of a plurality of different users (e.g., comprising hardware of and/or executable code running on one or more hardware devices 102). The plurality of supplementation modules 104 may act as a distributed and/or decentralized system 100, executing across multiple hardware devices 102, which are geographically dispersed and using different IP addresses, each supplementing and/or classifying data (e.g., photos, social media posts, medical records, financial transaction records, other financial data, and/or other user data) separately, in a distributed and/or decentralized manner.

In one embodiment, at least a portion of a supplementation module 104 may be integrated with or otherwise part of another application executing on a hardware device 102, such as a personal financial management application (e.g., computer executable code for displaying a user's financial transactions from multiple financial institutions, determining and/or displaying a user's financial budgets and/or financial goals, determining and/or displaying a user's account balances, determining and/or displaying a user's net worth, or the like), a photo viewer, a medical application, an insurance application, an accounting application, a social media application, or the like, which may use data the supplementation module 104 downloads from a server 108 of a data source 108.

In one embodiment, the supplementation modules 104a comprise a distributed system 100, with the supplementation modules 104a and/or the associated hardware devices 102 supplementing and/or classifying data substantially independently (e.g., downloading data concurrently or non-concurrently, without a global clock, with independent success and/or failure of components). Distributed supplementation modules 104a may pass messages to each other and/or to a server supplementation module 104b, to coordinate the supplementation and/or verification of data for users. In one embodiment, the supplementation modules 104a are decentralized (e.g., hardware devices 102 associated with users perform one or more supplementation functions such as downloading data, analyzing data, or the like), rather than relying exclusively on a centralized server or other device to perform one or more data supplementation and/or classification functions.

In a distributed and/or decentralized system 100, a central entity, such as a server supplementation module 104b and/or a server 110, in certain embodiments, may still provide, to one or more supplementation modules 104a, one or more messages comprising instructions for accessing a server 108 of a data source 108 using a user's credentials, or the like. For example, a server supplementation module 104b may provide one or more supplementation modules 104a of one or more hardware devices 102 with one or more sets of instructions for accessing a server 108 of a third party service 108, such as a location for entering a user's electronic credentials (e.g., a text box, a field, a label, a coordinate, or the like), an instruction for submitting a user's electronic credentials (e.g., a button to press, a link to click, or the like), one or more locations of data associated with a user (e.g., a row in a table or chart, a column in a table or chart, a uniform resource locator (URL) or other address, a coordinate, a label, or the like), and/or other instructions or information, using which the supplementation modules 104a may access and download a user's data.

In a further embodiment, one or more supplementation modules 104a may pass messages to each other, such as instructions for accessing a server 108 of a data source 108 using a user's credentials, or the like, in a peer-to-peer manner. In another embodiment, a central entity, such as a server supplementation module 104b, may initially seed one or more sets of instructions for accessing a server 108 of a data source 108 using a user's credentials to one or more supplementation modules 104a, and the one or more supplementation modules 104a may send the one or more sets of instructions to other supplementation modules 104a.

The one or more supplementation modules 104, in certain embodiments, may provide an interface (e.g., an application programming interface (API)) to provide data supplemented and/or verified data from servers 108 of one or more data sources 108 to one or more other entities (e.g., a server 110 unaffiliated with the data source 108, a server supplementation module 104b, or the like). The interface, in one embodiment, comprises a private interface between supplementation modules 104a of users' hardware devices 102 and one or more server supplementation modules 104b. For example, this may enable a server supplementation module 104b to provide a user with access to supplemented and/or classified data at multiple locations, on multiple hardware devices 102, through multiple channels, or the like, even if the user's hardware device 102 which downloaded the data is turned off, out of battery, not connected to the data network 106, or the like. In another embodiment, the interface comprises a public and/or open interface, which may be secured, allowing a user to share the user's downloaded data from a supplementation module 104 to one or more other tools, services, and/or other entities to store, process, and/or otherwise use the data.

In various embodiments, a supplementation module 104 may be embodied as hardware, software, or some combination of hardware and software. In one embodiment, a supplementation module 104 may comprise executable program code stored on a non-transitory computer readable storage medium for execution on a processor of a hardware device 102, a server 110, or the like. For example, a supplementation module 104 may be embodied as executable program code executing on one or more of a hardware device 102, a server 110, a combination of one or more of the foregoing, or the like. In such an embodiment, the various modules that perform the operations of a supplementation module 104, as described below, may be located on a hardware device 102, a server 110, a combination of the two, and/or the like.

In various embodiments, a supplementation module 104 may be embodied as a hardware appliance that can be installed or deployed on a server 110, on a user's hardware device 102 (e.g., a dongle, a protective case for a phone 102 or tablet 102 that includes one or more semiconductor integrated circuit devices within the case in communication with the phone 102 or tablet 102 wirelessly and/or over a data port such as USB or a proprietary communications port, or another peripheral device), or elsewhere on the data network 106 and/or collocated with a user's hardware device 102. In certain embodiments, a supplementation module 104 may comprise a hardware device such as a secure hardware dongle or other hardware appliance device (e.g., a set-top box, a network appliance, or the like) that attaches to another hardware device 102, such as a laptop computer, a server, a tablet computer, a smart phone, or the like, either by a wired connection (e.g., a USB connection) or a wireless connection (e.g., Bluetooth®, Wi-Fi®, near-field communication (NFC), or the like); that attaches to an electronic display device (e.g., a television or monitor using an HDMI port, a DisplayPort port, a Mini DisplayPort port, VGA port, DVI port, or the like); that operates substantially independently on a data network 106; or the like. A hardware appliance of a supplementation module 104 may comprise a power interface, a wired and/or wireless network interface, a graphical interface (e.g., a graphics card and/or GPU with one or more display ports) that outputs to a display device, and/or a semiconductor integrated circuit device as described below, configured to perform the functions described herein with regard to a supplementation module 104.

A supplementation module 104, in such an embodiment, may comprise a semiconductor integrated circuit device (e.g., one or more chips, die, or other discrete logic hardware), or the like, such as a field-programmable gate array (FPGA) or other programmable logic, firmware for an FPGA or other programmable logic, microcode for execution on a microcontroller, an application-specific integrated circuit (ASIC), a processor, a processor core, or the like. In one embodiment, a supplementation module 104 may be mounted on a printed circuit board with one or more electrical lines or connections (e.g., to volatile memory, a non-volatile storage medium, a network interface, a peripheral device, a graphical/display interface. The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of a supplementation module 104.

The semiconductor integrated circuit device or other hardware appliance of a supplementation module 104, in certain embodiments, comprises and/or is communicatively coupled to one or more volatile memory media, which may include but is not limited to: random access memory (RAM), dynamic RAM (DRAM), cache, or the like. In one embodiment, the semiconductor integrated circuit device or other hardware appliance of a supplementation module 104 comprises and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more data sources 108, in one embodiment, may include one or more network accessible computing systems such as one or more web servers hosting one or more web sites, an enterprise intranet system, an application server, an application programming interface (API) server, an authentication server, or the like. The one or more data sources 108 may include systems related to various institutions or organizations. For example, a data source 108 may include a system providing electronic access to a financial institution, a university, a government agency, a utility company, an email provider, a social media site, a photo sharing site, a video sharing site, a data storage site, a medical provider, or another entity that stores data associated with a user. A data source 108 may allow users to create user accounts to upload, view, create, and/or modify data associated with the user. Accordingly, a data source 108 may include an authorization system, such as a login element or page of a web site, application, or similar front-end, where a user can provide credentials, such as a username/password combination, to access the user's data.

In one embodiment, the one or more servers 110 and/or one or more server supplementation modules 104b provide central management of the networked swarm of supplementation modules 104a. For example, the one or more server supplementation modules 104b and/or a server 110 may store downloaded data from the supplementation modules 104a centrally, may provide instructions for the supplementation modules 104*a* to access data from one or more data sources 108 using user credentials, or the like. A server 110 may include one or more servers located remotely from the hardware devices 102 and/or the one or more data sources 108. A server 110 may include at least a portion of the modules or sub-modules of the supplementation modules 104, may comprise hardware of a supplementation module 104, may store executable program code of a supplementation module 104 in one or more non-transitory computer readable storage media, and/or may otherwise perform one or more of the various operations of a supplementation module 104 described herein in order to supplement and/or classify data from one or more data sources 108.

Figure 2:
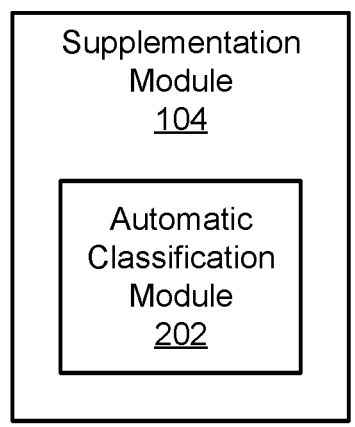
FIG. 2 is a schematic block diagram of one embodiment of a supplementation module.

FIG. 2 depicts one embodiment of a supplementation module 104. The supplementation module 104 of FIG. 2, in certain embodiments, may be substantially similar to the supplementation module 104 described above with regard to FIG. 1. In the depicted embodiment, the supplementation module 104 comprises an automatic classification module 202.

In response to determining that an identifier (e.g., a string, a name of an account such as an investment or other financial account, a name of a party to a transaction or other entity, a place holder, a variable name, a computer readable label, or the like) within downloaded and/or aggregated data is not a previously classified and/or known identifier (e.g., an identifier already matched to a classification in a classification database or other data structure), the automatic classification module 202, in one embodiment, is configured to query one or more supplemental data sources 112 using a search interface of a server 112 of a third party service provider 112, such as a search engine, a repository of business data (e.g., business intelligence data, big data, or the like), or the like, to assist in classifying, categorizing, labeling, and/or matching the identifier (e.g., making the identifier less confusing when displayed to a user). For example, the automatic classification module 202 may transmit an unidentifiable and/or unknown identifier (e.g., "Equity Account 476B") to a search interface (e.g., a search engine supplemental data source 112 of a third party service provider 112), and may receive results associated with the identifier (e.g., from a server 112 of a third party service provider 112) for processing to classify, categorize, label, and/or match the identifier. The results may comprise one or more search engine results (e.g., a webpage or other file received over a hypertext transfer protocol interface), database results, a payload of one or more data packets, and/or results formatted in another type of data structure.

In one embodiment, the automatic classification module 202 may be configured to parse and/or otherwise process the received results to determine whether one or more objects and/or entries within the results have a common pattern associated with a classification. As used herein, a common pattern may comprise one or more items and/or objects, identifiable in results, which indicate that an identifier associated with the results may have a certain classification. For example, a common pattern may comprise one or more keywords located within results, and the keywords may be associated with a predefined classification. The automatic classification module 202 may parse and/or otherwise process results, comparing words and/or terms within the results with a list of common patterns (e.g., keywords, indicators, or the like). In response to identifying multiple common patterns, in one embodiment, the automatic classification module 202 may assign multiple classifications (e.g., each associated with one of the identified common patterns) to the identifier. In a further embodiment, the automatic classification module 202 may weight and/or rank results (e.g., common patterns within results or the like) based on their relative positions within the received results, and may prioritize a common pattern over different common patterns having a lower weighting and/or ranking (e.g., being lower in the results, having a lower average position within the results, or the like).

The automatic classification module 202, in certain embodiments, may use one or more machine learning and/or artificial intelligent techniques to process data from one or more supplemental data sources 112 and to classify, categorize, label, and/or match an identifier from a data source 108 based on the result. In one embodiment, the automatic classification module 202 may use one or more rules to parse results (e.g., crawling, parsing, and/or scraping text of one or more webpages such as internet search results) from a supplemental data source 112 to classify, categorize, label, and/or match an identifier from a data source 108. For example, each category or label may have a set of one or more rules associated with it (e.g., if a predefined word or phrase is within N words, N lines, or the like of a searched identifier, the searched identifier belongs in the associated classification, category, and/or label; analyzing text/data around where a searched identifier appears; analyzing text in a header for a table or other data structure comprising a searched identifier; a predefined keyword associated with a classification is located in the results; or the like).

Figure 3:
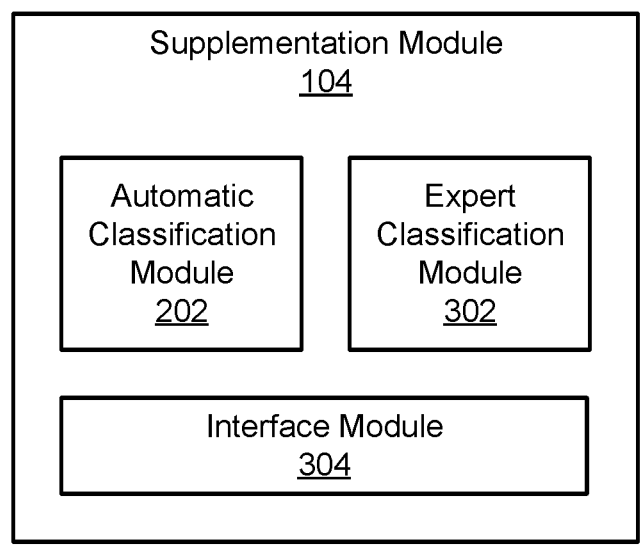
FIG. 3 is a schematic block diagram of another embodiment of a supplementation module.

The automatic classification module 202 may use one or more supplemental data sources 112 to provide an initial, automated classification, category, and/or label for data from a data source 108 (e.g., classifying an investment as a bond, stock, mutual fund, option, future, derivative, commodity, retirement account, another security, or the like; as low risk, medium risk, as high risk, or the like; as a small market capitalization "cap" stock, as a big or large cap stock, as a micro-cap stock, as a mega cap stock, or the like; a current state of a bond such as retired, closed early, a remaining term; and/or another classification), and may display or otherwise provide the initial category and/or label to a user (e.g., in a graphical user interface (GUI) of a display of a user hardware device 102, as part of a personal financial management program or the like), as described below with regard to the interface module 304 of FIG. 3. The automatic classification module 202 may confirm and/or correct its initial classification and/or labeling using a network of advisors, experts, and/or other users; may confirm and/or correct classification and/or labeling by users using one or more supplemental data sources 112; or the like.

FIG. 3 depicts a further embodiment of a supplementation module 104. The supplementation module 104 of FIG. 3, in certain embodiments, may be substantially similar to the supplementation module 104 described above with regard to FIG. 1 and/or FIG. 2. The supplementation module 104, in the depicted embodiment, includes an automatic classification module 202, an expert classification module 302, and an interface module 304.

In one embodiment, the expert classification module 302 may confirm and/or correct an initial classification and/or labeling of the automatic classification module 202, using a network of advisors, experts, and/or other users. In another embodiment, the automatic classification module 202 may confirm and/or correct an initial classification by the expert classification module 302. For example, in certain embodiments, the expert classification module 302 may associate an identifier with a classification made by one or more users in response to the automatic classification module 202 determining that received results for the identifier do not have a common pattern, do not have any one of a plurality of common patterns, or otherwise do not indicate a classification for the identifier.

The expert classification module 302 may cooperate with the interface module 304 to provide a GUI to one or more advisors, experts, and/or other users allowing them to categorize and/or label data from one or more data sources 108, to correct or update an existing categorization and/or label, to vote on (e.g., confirm or deny, agree or disagree, or the like) an existing categorization and/or label, or the like. In one embodiment, the expert classification module 302 may use a classification which a user made for the user's own use (e.g., a broker classifying an identifier of an investment account by account type for the broker's own customers, within a wealth management computer program product, or the like). The expert classification module 302 may motivate the one or more advisors, experts, and/or other users to classify, categorize, label, and/or vote, or to do so more regularly, by awarding them scores based on their contributions, by providing discounted access to the categorized and/or labeled data, and/or providing another incentive. The expert classification module 302 and/or the interface module 304 may share users' scores with other users, allow users to publish and/or share their scores, or the like (e.g., using dynamically updated widgets, profiles within a GUI of the interface module 304, on a display of a user hardware device 102, as an embedded widget or image in a website, or the like). Awarding scores, in certain embodiments, may encourage accurate participation.

The expert classification module 302, in certain embodiments, may asymptotically (and/or according to another predefined function) award decreasing points over time to users' scores as users vote on a classification, categorization, and/or label, awarding more points (e.g., a greater increase in score) to users that vote first and fewer points to users that vote later. In one embodiment, the expert classification module 302 may reduce a user's score in response to determining that the user made an incorrect categorization and/or label. The reduction in a user's score may also be asymptotic, with the expert classification module 302 reducing scores by more for earlier contributors and less for later contributors, or the like.

In certain embodiments, the expert classification module 302 may block certain participation by a user in response to the user making an incorrect classification and/or label. For example, the expert classification module 302 may block a user from making a first vote, being the first to categorize and/or label, or the like in response to a first incorrect vote/categorization/label, a predefined threshold number of incorrect votes/categorizations/labels, or the like; may block or ban a user from voting/classifying/categorizing/labeling in response to the user making a predefined threshold number of incorrect votes/categorizations/labels; may increase a fee for accessing categorized and/or labeled data in response to one or more incorrect votes/categorizations/labels; or the like.

The expert classification module 302, in certain embodiments, may perform one or more tests to ensure that a human is doing the voting, classifying, categorizing, and/or labeling, not an automated process (e.g., a robot program or the like). For example, the expert classification module 302 may use a captcha check, may monitor a frequency with which a user votes, may monitor a frequency with which accounts are created, may monitor IP addresses from which users access the expert classification module 302, or the like, and may ban or block certain users and/or certain votes accordingly.

The expert classification module 302, in certain embodiments, may determine one or more scores for classifications and/or categorizations. For example, the expert classification module 302 may score a classification and/or categorization based on the scores of the users that voted for and/or against the classification and/or categorization, based on a number of votes, based on how recent the votes are (e.g., giving more recent votes more weight), or the like.

The expert classification module 302, in certain embodiments, may display one or more additional factors with a score for a categorization and/or classification, such as a trend over time (e.g., one or more historical categorizations and/or classifications, a histogram or other chart showing the number of votes over time for and against a categorization and/or classification, a histogram or other chart showing how the score has changes over time, an event or clarification which effected a categorization and/or classification, other categorizations/classifications/labels that are possible and/or have votes, or the like).

For example, for classifications made by one or more other users, but not verified by the automatic classification module 202 using one or more supplemental data sources 112, for classifications verified and/or voted on by less than a threshold number of users, or the like, the interface module 304 may display the classification for an identifier with an indicator that the classification is a suggested classification for the identifier (e.g., an estimated classification, an unverified classification, a preliminary classification, or the like), such as a confidence metric (e.g., determined based on a number of votes, based on scores of one or more classifying users, based on output of machine learning or artificial intelligence, or the like), such as one or more links (e.g., website URLs, attachments, images, or the like) to sources confirming the classification made by one or more users, or the like. Similarly, in certain embodiments, the interface module 304 may be configured to display to a user, with a classification from the automatic classification module 202, one or more links to search results from one or more supplemental data sources 112, as one or more sources confirming the classification.

The expert classification module 302, in one embodiment, may cooperate with the interface module 304 to proactively prompt and/or request that a user classify/categorize/label data. For example, the expert classification module 302 may cause the interface module 304 to make a prompt and/or request based on a user's expertise, based on a history of the user's previous votes and/or classifications, to fill in missing or low quality data, or the like. The expert classification module 302 may cause the interface module 304 to present a prompt within a GUI on a user's hardware device 102, using an API, using a push notification, using a text message, using an email, or the like. The expert classification module 302, in certain embodiments, may cause the interface module 304 to provide and/or display an impact of a potential vote on a user's score to the user, to encourage the user to make a vote.

FIG. 4 depicts one embodiment of downloaded and/or aggregated data 400. The downloaded and/or aggregated data 400, in the depicted embodiment, comprises a list of investment funds, with inception dates, yields over various periods of time, expense ratios, and the like. In other embodiments, downloaded and/or aggregated data 400 may comprise a list of transactions, or other data with one or more identifiers. Each investment fund in the downloaded and/or aggregated data 400 is associated with an identifier (e.g., a name of the investment fund). As one example, the identifier 402 (e.g., "Janus Triton Fund—Class N") may not be a previously classified and/or known identifier, so the automatic classification module 202 may classify the identifier 402 using results from one or more supplemental data sources 112 (e.g., as described below with regard to FIG. 5), the expert classification module 202 may classify the identifier 402 based on input from one or more users, or the like.

Figure 5:
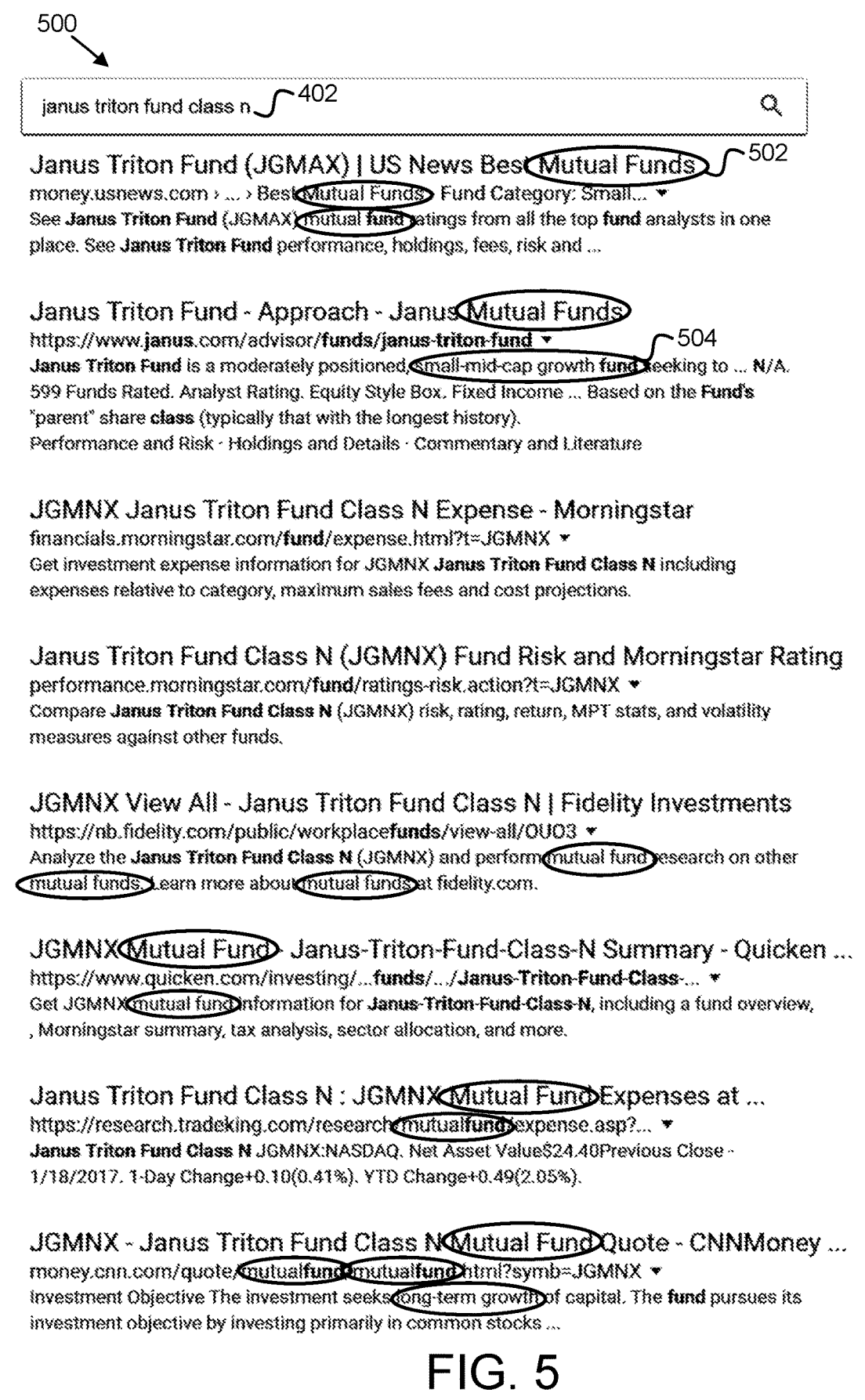

FIG. 5 depicts one embodiment of results 500. In one embodiment, the automatic classification module 202 may transmit the identifier 402 (e.g., "Janus Triton Fund—Class N") to a search interface of a server 112 of a third party service provider 112 (e.g., a supplemental data source 112), and may receive the results 500 associated with the identifier 402 in response. The automatic classification module 202 may parse the results 500 (e.g., text of a webpage or the like), and may locate a first common pattern 502 indicating that the identifier 402 should be classified as a "mutual fund," may locate a second common pattern 504 indicating that the identifier 402 should be classified as a "small-mid-cap growth fund," or the like. The automatic classification module 202 may parse the text of the results 500 webpage itself, may follow one or more hyperlinks or URLs from the results 500 webpage to parse the linked-to pages, may parse both, or the like. In this example, the automatic classification module 202 may classify the identifier "Janus Triton Fund—Class N" as a small-mid-cap growth mutual fund, or the like.

Figure 6:
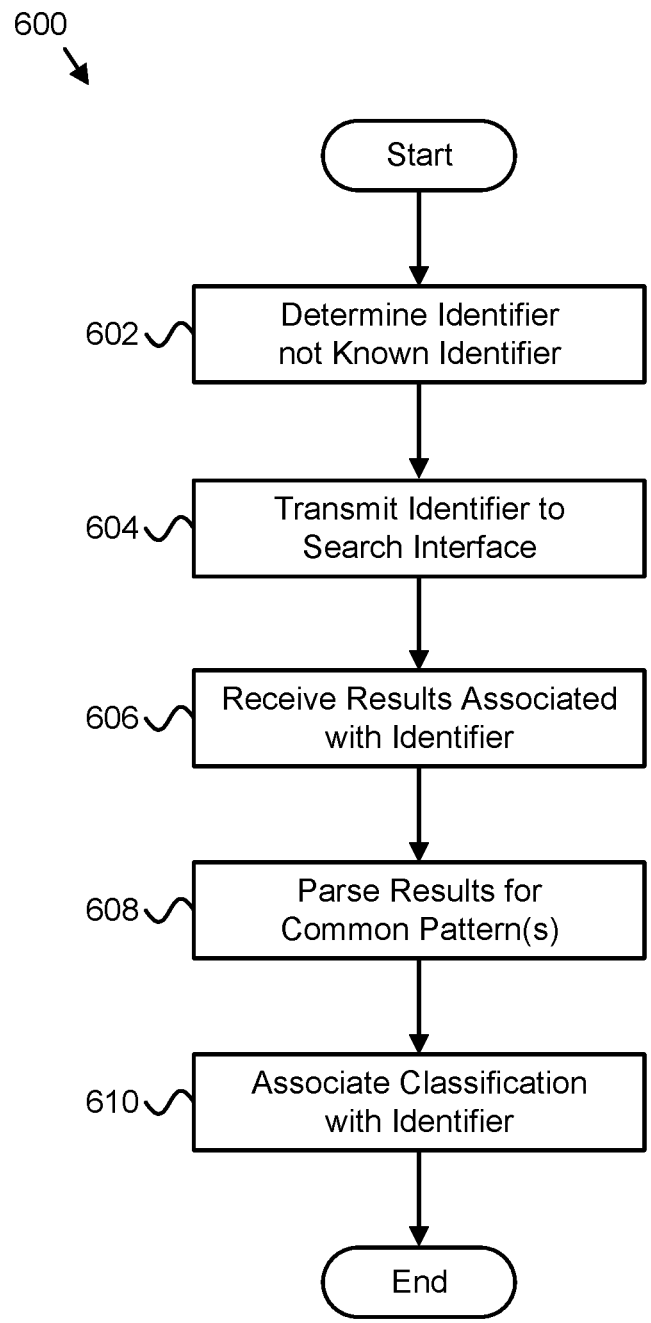
FIG. 6 is a schematic flow chart diagram illustrating one embodiment of a method for data supplementation and/or verification.

FIG. 6 depicts one embodiment of a method 600 for data supplementation and/or verification. The method 600 begins and the automatic classification module 202 determines 602 that an identifier within aggregated data is not a previously classified known identifier. The automatic classification module 202 transmits 604 the identifier to a search interface of a server 112 of a third party service provider 112. The automatic classification module 202 receives 606 results associated with the identifier from the third party service provider 112. The automatic classification module 202 parses 608 the received 606 results to determine whether a plurality of the received 606 results have a common pattern associated with a classification. In response to determining 608 that a plurality of the received 606 results have a common pattern associated with the classification, the automatic classification module 202 associates 610 the classification with the identifier based on the common pattern and the method 600 ends.

Figure 7:
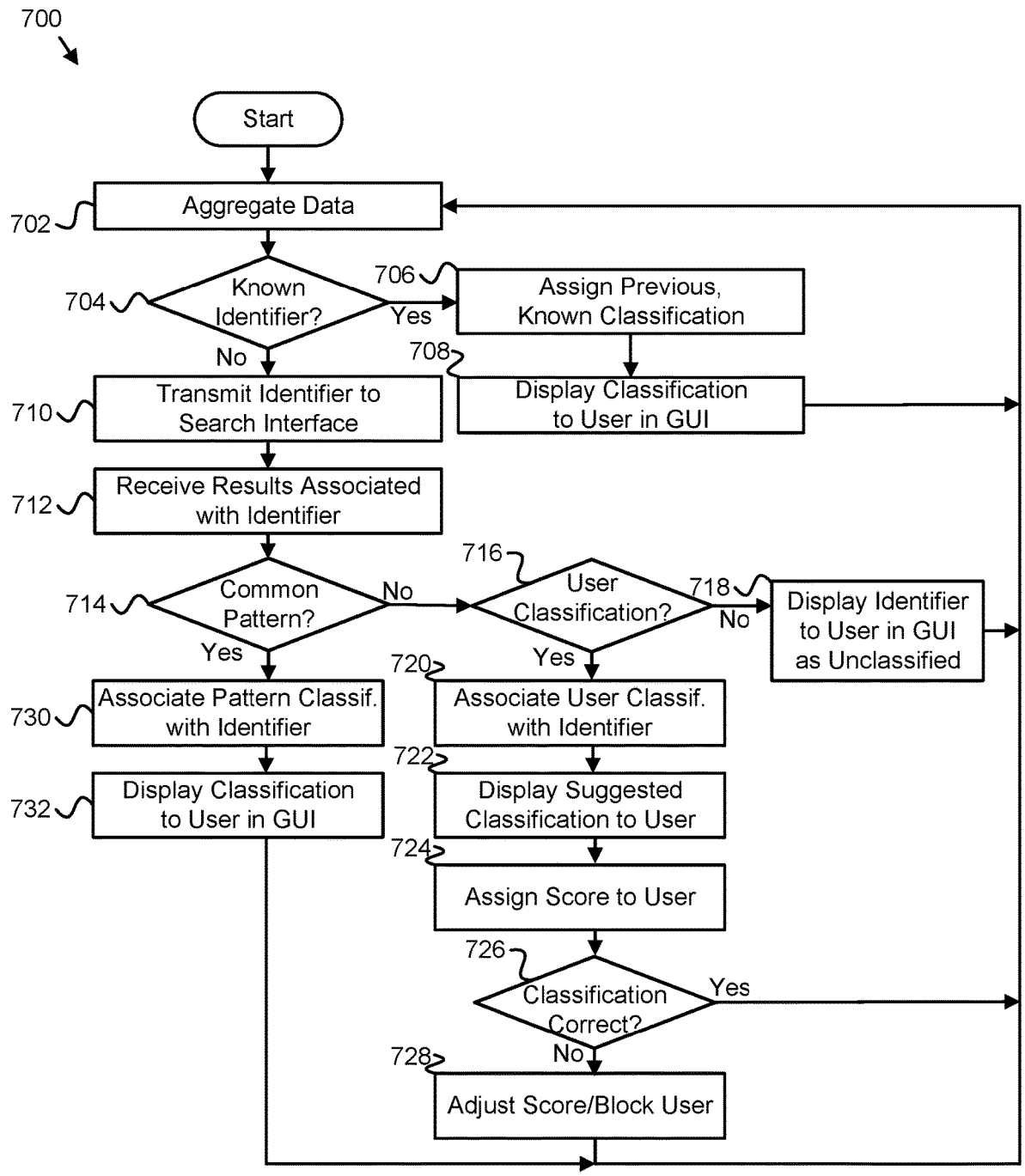
FIG. 7 is a schematic flow chart diagram illustrating a further embodiment of a method for data supplementation and/or verification.

FIG. 7 depicts one embodiment of a method 700 for data supplementation and/or verification. The method 700 begins and the automatic classification module 202 downloads and/or aggregates 702 data 400 from one or more data sources 108. The automatic classification module 202 determines 704 whether or not an identifier 402 within the aggregated 702 data 400 is not a previously classified known identifier 402. If the automatic classification module 202 determines 704 that the identifier 402 is a previously classified known identifier 402, the automatic classification module 202 assigns 706 the previously known classification to the identifier 402 and the interface module 304 displays 708 the assigned 706 classification to one or more users in a graphical user interface (e.g., displaying 708 the identifier 402 as "classified" with the assigned 706 classification, or the like). The method 700 may continue, as the automatic classification module 202 continues to process identifiers 402 from aggregated 702 data.

If the automatic classification module 202 determines 704 that the identifier 402 is not a previously known identifier 402, the automatic classification module 202 transmits 710 the identifier 402 to a search interface of a server 112 of a third party service provider 112. The automatic classification module 202 receives 712 results 500 associated with the identifier 402 from the third party service provider 112. The automatic classification module 202 parses the received 712 results to determine 714 whether a plurality of the received 712 results have a common pattern 502, 504 associated with a classification.

If the automatic classification module 202 determines 714 that a plurality of the received 712 results have a common pattern 502, 504 associated with a classification, the automatic classification module 202 associates 730 the classification with the identifier 402 based on the common pattern 502, 504 and the interface module 304 displays 732 the associated 730 classification with the identifier 402 to one or more users in a graphical user interface (e.g., displaying 732 the identifier 402 as "classified" with the associated 730 classification, or the like). The automatic classification module 202 may add the associated 730 classification to a classification database or other data structure in association with the identifier 402, such that the identifier becomes a previously known classified identifier when processed in subsequently aggregated 702 data. If the automatic classification module 202 determines 714 that the received 712 results do not have a common pattern 502, 504, the expert classification module 302 determines 716 whether the identifier 402 has been classified by a user.

If the expert classification module 302 determines 716 that the identifier 402 has been classified by a user, the expert classification module 302 associates 720 the identifier 402 with the classification made by the user and the interface module 304 displays 722 the associated 720 classification with the identifier 402 to one or more users in a graphical user interface (e.g., displaying 720 the identifier 402 with the associated 720 classification as a "suggested classification" or the like). The expert classification module 302, in certain embodiments, may add the associated 730 classification to a classification database or other data structure in association with the identifier 402, such that the identifier becomes a previously known classified identifier when processed in subsequently aggregated 702 data (e.g., with a "suggested classification" status, or the like).

The expert classification module 302 may assign 724 a score to the user which classified the identifier 402 (e.g., increasing a score associated with the user or the like). The expert classification module 302 may later determine 726 whether the classification by the user was correct (e.g., based on a later classification by the automatic classification module 202, based on classifications and/or votes of other users, or the like). If the expert classification module 302 determines 726 that the classification was incorrect, the expert classification module 302 may block 728 the user from at least a subset of subsequent participation within the graphical user interface and/or may lower 728 a score of the user, or the like. The method 700 may continue, as the automatic classification module 202 continues to process identifiers 402 from aggregated 702 data.

If the expert classification module 302 determines 716 that the identifier 402 has not and/or will not be classified by a user, the interface module 304 displays 718 the identifier 402 to one or more users in the graphical user interface as "unclassified," or the like. In this manner, the interface module 304 may present and/or display identifiers 402 in one of at least three states, "classified," "unclassified," and "suggested classification," or the like. The method 700 may continue, as the automatic classification module 202 continues to process identifiers 402 from aggregated 702 data.

Means for determining that an identifier 402 within aggregated data 400 is not a previously classified known identifier 402, in various embodiments, may include one or more of a hardware device 102, a server 110, a supplementation module 104, an automatic classification module 202, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for determining that an identifier 402 within aggregated data 400 is not a previously classified known identifier 402.

Means for transmitting an identifier 402 to a search interface of a server 112 of a third party service provider 112, in various embodiments, may include one or more of a hardware device 102, a server 110, a supplementation module 104, an automatic classification module 202, a network interface, a wireless transmitter, a network appliance, a modem, a router, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for transmitting an identifier 402 to a search interface of a server 112 of a third party service provider 112.

Means for receiving results 500 associated with an identifier 402 from the third party service provider 112, in various embodiments, may include one or more of a hardware device 102, a server 110, a supplementation module 104, an automatic classification module 202, a network interface, a wireless receiver, a network appliance, a modem, a router, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for receiving results 500 associated with an identifier 402 from the third party service provider 112.

Means for parsing results 500 to determine whether a plurality of the results 500 have a common pattern 502, 504 associated with a classification, in various embodiments, may include one or more of a hardware device 102, a server 110, a supplementation module 104, an automatic classification module 202, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for parsing results 500 to determine whether a plurality of the results 500 have a common pattern 502, 504 associated with a classification.

Means for, in response to determining that a plurality of results 500 have a common pattern 502, 504 associated with a classification, associating the classification with an identifier based on the common pattern 502, 504, in various embodiments, may include one or more of a hardware device 102, a server 110, a supplementation module 104, an automatic classification module 202, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for, in response to determining that a plurality of results 500 have a common pattern 502, 504 associated with a classification, associating the classification with an identifier based on the common pattern 502, 504.

Means for, in response to determining that a plurality of results 500 do not have a common pattern 502, 504 and/or do not have one of a plurality of common patterns 502, 504, associating an identifier with a classification made by a user in a graphical user interface for accessing aggregated data 400, in various embodiments, may include one or more of a hardware device 102, a server 110, a supplementation module 104, an expert classification module 302, an interface module 304, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for, in response to determining that a plurality of results 500 do not have a common pattern 502, 504 and/or do not have one of a plurality of common patterns 502, 504, associating an identifier with a classification made by a user in a graphical user interface for accessing aggregated data 400.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A method comprising:
   determining that an identifier within aggregated data is not a previously classified known identifier;
   transmitting the identifier to a search interface of a server of a third party service provider;
   receiving results associated with the identifier from the third party service provider;
   parsing the results to determine that a plurality of the results have a common pattern associated with a classification; and
   in response to determining that the plurality of the results do not have the common pattern and do not have one of a plurality of common patterns associated with the classification:

presenting a graphical user interface for accessing the aggregated data to a user, the graphical user interface comprising at least one field for receiving a classification for the identifier from a user;

performing one or more tests to verify that the user providing the classification is a human user, the one or more tests performed without user input;

in response to verifying that the user is a human user:
receiving a classification for the identifier from the user;
associating the identifier with the received classification;
determining a score for the user based on the received classification, the score determined according to a timing in which the classification is received from the user;
adjusting the determined score in response to subsequently determining an accuracy of the received classification; and
one or more of blocking the user from at least a subset of subsequent participation within the graphical user interface and lowering a score of the user, in response to determining that the classification made by the user is inaccurate.

2. The method of claim 1, further comprising displaying, to a different user, the classification made by the user and an indicator that the classification is a suggested classification.

3. The method of claim 2, wherein the indicator to the different user that the classification is a suggested classification comprises a confidence metric for the classification based on a score determined for the user that made the classification.

4. The method of claim 2, wherein the indicator to the different user that the classification is a suggested classification comprises a link to one or more sources confirming the classification made by the user, the one or more sources provided by the user to the graphical user interface.

5. The method of claim 1, further comprising providing the user a score based on the classification made by the user.

6. The method of claim 5, further comprising asymptotically reducing scores awarded to other users over time for classifying the same identifier already classified by the user.

7. The method of claim 1, further comprising proactively prompting the user to classify the identifier based on a history of previous classifications by the user.

8. The method of claim 1, further comprising displaying, to a different user, the classification and one or more links to at least one of the plurality of the results as one or more sources confirming the classification.

9. The method of claim 1, wherein the results comprise internet search results and the method further comprises weighting the plurality of the results based on relative positions of the plurality of the results within the received results such that the common pattern is prioritized over one or more different patterns having a lower weighting than the common pattern.

10. The method of claim 1, wherein the search interface of the server of the third party service provider comprises a hypertext transfer protocol interface and parsing the results comprises parsing text of a web page received from the server of the third party service provider.

11. The method of claim 1, wherein the identifier comprises a name of an account for a plurality of users and the classification comprises a type of the account.

12. A computer program product comprising a computer readable storage medium storing computer usable program code executable to perform operations, the operations comprising:
determining that an identifier within aggregated data is not a previously classified known identifier;
transmitting the identifier to a search interface of a server of a third party service provider;
receiving results associated with the identifier from the third party service provider;
parsing the results to determine that a plurality of the results have a common pattern associated with a classification;
in response to determining that the plurality of the results have the common pattern associated with the classification, associating the classification with the identifier based on the common pattern; and
in response to determining that the plurality of the results do not have the common pattern and do not have one of a plurality of common patterns associated with the classification:
presenting a graphical user interface for accessing the aggregated data to a user, the graphical user interface comprising at least one field for receiving a classification for the identifier from a user;
performing one or more tests to verify that the user providing the classification is a human user, the one or more tests performed without user input;
in response to verifying that the user is a human user:
receiving a classification for the identifier from the user associating the identifier with the received classification;
determining a score for the user based on the received classification, the score determined according to a timing in which the classification is received from the user;
adjusting the determined score in response to subsequently determining an accuracy of the received classification; and
one or more of blocking the user from at least a subset of subsequent participation within the graphical user interface and lowering a score of the user, in response to determining that the classification made by the user is inaccurate.

13. The computer program product of claim 12, the operations further comprising displaying, to a different user, the classification made by the user in association with an indicator to the different user that the classification is a suggested classification.

14. The computer program product of claim 12, the operations further comprising providing the user a score based on the classification made by the user.

15. The computer program product of claim 14, the operations further comprising asymptotically reducing scores awarded to other users over time for classifying the same identifier already classified by the user.

16. The computer program product of claim 12, the operations further comprising one or more of blocking the user from at least a subset of subsequent participation within the graphical user interface and lowering a score of the user, in response to determining that the classification made by the user is inaccurate.

17. The computer program product of claim 12, the operations further comprising proactively prompting the user to classify the identifier based on a history of previous classifications by the user.

18. The computer program product of claim 12, wherein the results comprise internet search results and the operations further comprise weighting the plurality of the results based on relative positions of the plurality of the results within the received results such that the common pattern is prioritized over one or more different patterns having a lower weighting than the common pattern.

19. An apparatus comprising:
means for determining that an identifier within aggregated data is not a previously classified known identifier;
means for transmitting the identifier to a search interface of a server of a third party service provider;
means for receiving results associated with the identifier from the third party service provider;
means for parsing the results to determine that a plurality of the results have a common pattern associated with a classification; and
in response to determining that the plurality of the results do not have the common pattern and do not have one of a plurality of common patterns associated with the classification:
  means for presenting a graphical user interface for accessing the aggregated data to a user, the graphical user interface comprising at least one field for receiving a classification for the identifier from a user;
  means for performing one or more tests to verify that the user providing the classification is a human user, the one or more tests performed without user input;
  in response to verifying that the user is a human user:
    means for receiving a classification for the identifier from the user;
    means for associating the identifier with the received classification,
    means for determining a score for the user based on the received classification, the score determined according to a timing in which the classification is received from the user;
    means for adjusting the determined score in response to subsequently determining an accuracy of the received classification; and
    means for one or more of blocking the user from at least a subset of subsequent participation within the graphical user interface and lowering a score of the user, in response to determining that the classification made by the user is inaccurate.

20. The apparatus of claim 19, wherein the results comprise internet search results and the apparatus further comprises means for weighting the plurality of the results based on relative positions of the plurality of the results within the received results such that the common pattern is prioritized over one or more different patterns having a lower weighting than the common pattern.

* * * * *